US012798337B2

(12) United States Patent
Krämer

(10) Patent No.: US 12,798,337 B2
(45) Date of Patent: Nov. 17, 2026

(54) DECORATIVE ELEMENT FOR AIR DIFFUSERS, AIR DIFFUSERS HAVING SUCH A DECORATIVE ELEMENT, AS WELL AS METHOD FOR MANUFACTURING AN AIR DIFFUSER

(71) Applicant: Illinois Tool Works Inc., Glenview, IL (US)

(72) Inventor: Günther Krämer, Enkenbach-Alsenborn (DE)

(73) Assignee: Illinois Tool Works Inc., Glenview, IL (US)

( * ) Notice: Subject to any disclaimer, the term of this patent is extended or adjusted under 35 U.S.C. 154(b) by 362 days.

(21) Appl. No.: 18/236,264

(22) Filed: Aug. 21, 2023

(65) Prior Publication Data

US 2024/0059128 A1 Feb. 22, 2024

(30) Foreign Application Priority Data

Aug. 22, 2022 (DE) ..................... 10 2022 121 133.9

(51) Int. Cl.
*B60H 1/34* (2006.01)

(52) U.S. Cl.
CPC ... *B60H 1/3421* (2013.01); *B60H 2001/3492* (2013.01)

(58) Field of Classification Search
CPC ...................... B60H 1/3421; B60H 2001/3492
USPC ................................ 454/155, 275, 284, 289
See application file for complete search history.

(56) References Cited

U.S. PATENT DOCUMENTS

| | | | | |
|---|---|---|---|---|
| 9,162,551 | B2 * | 10/2015 | Yamamoto | B60H 1/3428 |
| 10,144,269 | B2 * | 12/2018 | Zhang | B60H 1/3421 |
| 2015/0087217 | A1 * | 3/2015 | Switzer | B60H 1/248 454/155 |
| 2020/0406722 | A1 * | 12/2020 | Kim | B60H 1/0065 |

FOREIGN PATENT DOCUMENTS

JP 2017171204 A * 9/2017

* cited by examiner

*Primary Examiner* — Avinash A Savani
*Assistant Examiner* — Dana K Tighe
(74) *Attorney, Agent, or Firm* — McAndrews, Held & Malloy, Ltd.

(57) ABSTRACT

The disclosure relates in particular to a decorative element (5) for air vents (1). The decorative element (5) includes a base body (6) that is provided or can be provided with at least one connecting part (7). The at least one connecting part (7) includes a first joining element for forming as needed an at least in portions positively locking connection with a second joining element (12) that is formed on the air vent housing (2) of the air vent (1) or on a screen (4) of the air vent (1).

20 Claims, 4 Drawing Sheets

DECORATIVE ELEMENT FOR AIR DIFFUSERS, AIR DIFFUSERS HAVING SUCH A DECORATIVE ELEMENT, AS WELL AS METHOD FOR MANUFACTURING AN AIR DIFFUSER

RELATED APPLICATION

The present application claims the benefit of German Patent Application No. DE 10 2022 121 133.9, filed Aug. 22, 2022, the contents of which are hereby incorporated by reference.

BACKGROUND

The air diffusers typically used in ventilation devices for vehicles are air diffusers that enable the exiting or outflowing airflow to be controlled in a targeted manner. Such air diffusers are used in order to supply in particular fresh air into a vehicle cabin.

The airflow flows through an inlet opening of the respective air diffuser into an air duct which is at least partly delimited by the housing wall of the air diffuser housing, through said air duct, and ultimately through the outlet opening of the air diffuser into the cabin of the vehicle (for example a car or truck). The flow strength, i.e., the amount of air flowing into the cabin of the vehicle via the air diffuser per unit of time, can usually be adjusted, in particular manually, via a controlling element.

Air diffusers are usually also equipped with airflow directing or airflow regulating air-guiding elements, which can be accordingly manipulated in order to achieve a targeted deflection or directing of the airflow emitted by the air diffuser. This guidance can be in a horizontal and/or vertical direction, for example, and is likewise in particular manually adjustable by means of controlling elements.

The air diffusers usually also comprise closing means in order to move them manually from an open state, in which air can flow out of the air diffuser, to a closed state, in which no air can flow out of the air diffuser, and vice versa. It is furthermore usually also possible to adjust the temperature of individual air diffusers, or a plurality of air diffusers together, in order to supply cooled or heated air into the vehicle cabin.

Thus, in summary, for air diffusers, it is usually possible to adjust an open/closed state, a flow temperature, a flow strength, and a flow direction by means of controlling elements. The controlling elements are often individually adjustable by hand and then usually remain in their set position.

However, air diffusers known from the prior art are usually structured such that they are configured for a specific purpose, for example for a specific vehicle type or for a special arrangement in the vehicle cabin. Air diffusers inside a vehicle, for example along a vehicle dashboard, can also have different configurations, wherein the air diffusers differ in terms of the shape and configuration of the housing, the number of air-guiding elements, and the configuration of closing means and panels arranged on the front or on either side.

In addition to air diffusers, further interior furnishing parts are used in vehicle cabins, for example to clad body elements in the region of the doors. Interior furnishing parts that provide a cladding effect are also used in other regions of the vehicle cabin. This could be, for example, the cockpit, the instrument panel, or other equipment parts. These interior cladding parts are made of, for example, different plastic materials, cloth materials, or high-quality materials such as leather, as well as a combination thereof.

Such interior cladding parts, like the outflow region of air diffusers, are increasingly used in order to attract the attention of consumers and enhance the overall appearance of the vehicle. The interior furnishing of a vehicle is therefore an increasingly distinguishing feature and should be designed in order to create style and ambience as desired by the car buyer.

In this context, there is in particular also a need for interior furnishing parts, in particular air diffusers, that allow as much design freedom as possible in order to meet the ever-increasing specifications in terms of the appearance of the interior furnishing of a vehicle with as basic a type of air diffuser as possible.

In light of the above, a need exists for a solution with which it is possible to provide an air diffuser of the aforementioned type, which allows as much design freedom as possible while being simply manufactured.

SUMMARY

The present disclosure relates generally to an air diffuser, substantially as illustrated by and described in connection with at least one of the figures, as set forth more completely in the claims. More specifically, the present disclosure relates to air diffuser systems for supplying air into a vehicle cabin of a vehicle, and in particular to corresponding air diffusers.

This problem is addressed according to the disclosure by an air diffuser for vehicles and a decorative element for air diffusers according to the independent claims, wherein advantageous further developments of the decorative element are specified in the dependent claims. Finally, the problem addressed by the disclosure is further addressed by a method for manufacturing an air diffuser for vehicles according to the parallel claim.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
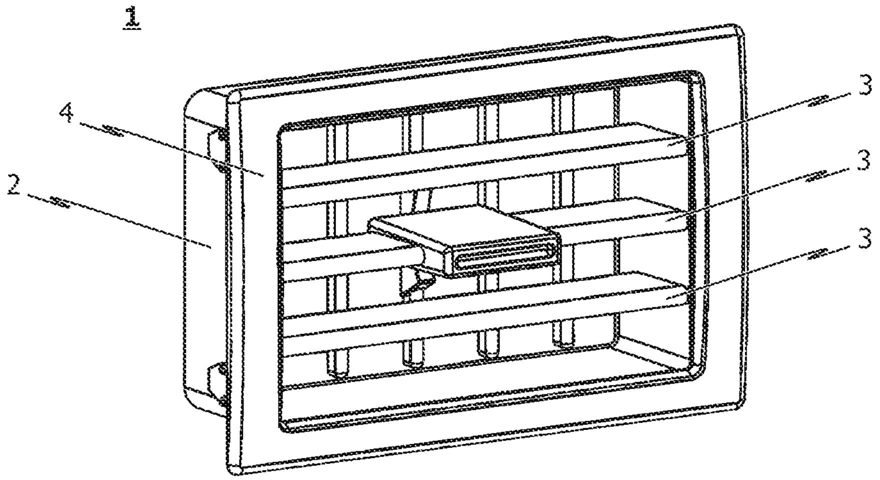
FIG. 1A illustrates schematically and in an isometric view, an exemplary embodiment of an air diffuser without a decorative element.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "coupled," "coupled to," and "coupled with" as used herein, each mean a relationship between or among two or more devices, apparatuses, elements, functions, operations, processes, components, systems, subsystems, and/or means, constituting any one or more of: (i) a connection, whether direct or through one or more other devices, apparatuses, files, elements, functions, operations, processes, components, systems, subsystems, or means; and/or (ii) a functional relationship in which the operation of any one or more devices, apparatuses, elements, functions, operations, processes, components, systems, subsystems, or means depends, in whole or in part, on the operation of any one or more others thereof.

The disclosure relates in particular to a decorative element for air diffusers, wherein the decorative element is preferably configured as a type of "chrome brace" and is configured so as to be placed in the region of an air outlet opening of the air diffuser and connected there, preferably in a detachable or exchangeable manner, to the housing of the air diffuser.

The decorative element, which is configured as a chrome brace according to preferred embodiments of the disclosure, can be configured so as to cover or hide at least a region of the air outlet opening of the air diffuser, so that the air-guiding elements of the air diffuser, which are arranged preferably pivotally in the air diffuser housing upstream of the air outlet opening, [cannot be seen] from the vehicle cabin.

The decorative element according to the disclosure is characterized in particular in that it can be connected, in an exchangeable and in particular in a detachable manner, to the air diffuser housing in order to thus allow as much freedom of design as possible for the external appearance of the air diffuser.

In this context, in particular, a special fastening of the decorative element to the air diffuser housing is provided, wherein this fastening is characterized in that a fastening of the decorative element to the air diffuser housing by means of a material-locking connection, in particular by means of glue, is not necessary.

The disclosure is based on the finding that gluing the decorative element to the air diffuser housing has disadvantages. For example, only small amounts of an adhesive can be used when bonding, because, on the one hand, the components involved in the process are relatively thin-walled and, on the other hand, in the connected state of the components, the glue may not protrude out of the joints between the components. However, due to the small amount of adhesive, the result is often not satisfactory, because the components (air diffuser housing and decorative element) are not sufficiently firmly connected to one another. As a result, all parts must be inspected, wherein there are still a large number of rejects.

Moreover, a material-locking connection between the decorative element and the air diffuser housing has the disadvantage that an individual design, and in particular a retrospective individual redesign of the design of an air diffuser, is no longer possible. This leads to a restriction of design freedom in the design of the vehicle cabin, and the possibility of enhancing the overall appearance of the vehicle cabin is limited.

In order to avoid these disadvantages, it is provided in particular according to the disclosure that the decorative element is connected or connectable to the air diffuser housing not via a material-locking connection. Rather, the decorative element is connected to the housing of the air diffuser preferably in an exchangeable manner at least in regions via a positively locking connection.

For this purpose, it is provided in particular according to the disclosure that the decorative element comprises a base body, which is equipped or can be equipped with at least one connecting part, wherein the at least one connecting part comprises a first joining element for forming as needed an at least regionally material [sic: positively] locking connection with a second joining element, which is preferably formed on the housing of the air diffuser (air diffuser housing) and/or on a screen of the air diffuser.

According to implementations of the decorative element according to the disclosure, it is provided in particular that the first joining element of the decorative element, which is provided on the base body of the decorative element, [is configured so as to form] a snap or latch connection with the second joining element, which is configured on the air diffuser housing and/or on the screen of the air diffuser. With this measure, the decorative element fulfills specified guidelines that meet a certain level of safety and strength, while not limiting the design freedom.

According to embodiments of the decorative element according to the disclosure, it is provided that the first joining element of the decorative element comprises a body region projecting from the base body of the decorative element, which body region is configured so as to at least regionally receive and/or enclose the second joining element of the air diffuser housing and/or the screen of the air diffuser, wherein, for this purpose, the body region of the first joining element preferably comprises a recess region or a hole, in particular an elongated hole, wherein the recess region or the hole is preferably formed so as to be complementary to the second joining element at least regionally.

Alternatively or additionally, according to embodiments of the decorative element according to the disclosure, it is provided that the first joining element comprises a body region projecting from the base body of the decorative element, which is configured so as to be receivable at least regionally in a slot region formed at least regionally in the housing of the air diffuser and/or in a screen of the air diffuser.

The body region of the decorative element preferably forms the region of the decorative element that is visible from the vehicle cabin in the installed state of the air diffuser. As already stated, this is in particular a region configured as, for example, a chrome brace.

In particular, the decorative element, and in this case the base body of the decorative element, has dimensions that are smaller than the dimensions of the air outlet opening of the air diffuser, so that the decorative element differs from a screen. In this context, it is conceivable, for example, that the base body of the decorative element has a width corresponding at least substantially to the width of the air outlet opening of the air diffuser, wherein the base body of the decorative element has a height that is preferably less than the height of the air outlet opening of the air diffuser.

In this embodiment of the decorative element according to the disclosure, at least one connecting part with a respective first joining element is provided on at least one broad side, and preferably on both opposing broad sides of the base body, and projects outwardly from the corresponding broad side with respect to the base body.

Preferably, the decorative element is formed integrally as a plastic injection molded part, although other implementations are also possible.

According to a further aspect of the disclosure, it relates to an air diffuser for vehicles having an air diffuser housing and a decorative element of the aforementioned type according to the disclosure. The decorative element is connected or connectable to the air diffuser housing, preferably in a detachable or exchangeable manner, in such a way that the base body of the decorative element is placed at least regionally in the region of an air outlet opening of the air diffuser.

In order to be able to securely connect the decorative element to the air diffuser housing, at least one slot region is preferably configured on opposite sides of the air diffuser housing, in which slot region a body region of the connecting part (of the first joining element) of the decorative element projecting outwardly from the base body of the decorative element is receivable at least regionally. The at least one slot region is in particular assigned the task of fixing the body region of the connecting part or the first joining element of the decorative element as a counter-bearing in one direction (for example in the X direction).

According to preferred embodiments of the air diffuser according to the disclosure, it comprises a screen on the air outlet opening of the air diffuser, which can be connected, preferably in a detachable or exchangeable manner, to the air diffuser housing, preferably on the front face, in order to be able to hide the peripheral region of the air diffuser housing with the aid of the screen.

The screen comprises at least one joining element (second joining element) which, when the screen is connected to the air diffuser housing, cooperates with the body region of the connecting part of the decorative element in such a way that the screen and the decorative element are fastened to the air diffuser housing.

According to preferred implementations, it is provided in this context that the at least one joining element of the screen is executed and configured as an at least regionally protruding part, in particular in the form of a pin, in order to be removed [sic: received] and/or enclosed at least regionally by a recess region or hole, in particular an elongated hole, in the body region of the connecting part (of the first joining element) of the decorative element when the screen is connected to the air diffuser housing. In this way, a fixation of the decorative element to the air diffuser housing in the two other spatial directions, for example in the Y and Z directions, is possible.

In order for not only the decorative element, but also the screen to be able to be securely connected to the air diffuser housing, in particular in a detachable or exchangeable manner, with one and the same joining element assembly, it is suggested that at least one slot, in particular in the form of a blind hole, is preferably configured on the face of the air diffuser housing and is associated with the at least one joining element (the second joining element) of the screen and is configured in order to at least regionally receive the at least one joining element of the screen, preferably in a detachable manner and in particular while forming a snap or latch connection, when the screen is connected to the air diffuser housing.

According to a further aspect of the air diffuser according to the disclosure, it is provided that the air diffuser housing, the decorative element, and/or the screen of the air diffuser at least partially comprise(s) an anti-creaking coating.

This aspect is based on the finding that, in particular in the case of air diffusers, vibrations or components that rub against one another are not avoidable in operation, which produce noise or a creaking, creating a disruptive background noise in the vehicle cabin. With a corresponding anti-creaking coating, a noise attenuation (avoidance of mechanical vibrations) can be realized.

In particular, so-called bonded coatings, which can comprise grease lubricants such as molybdenum sulfide, graphite, or Teflon (polytetrafluorethylene), can be considered as the anti-creaking coating. The particular characteristic of bonded coatings is that after application, they develop a thin layer of lubricant that prevents friction and wear on abutting surfaces. This is made possible by the crystalline structure of the grease lubricants that can develop their lubricating effect without the surface appearing differently than with conventionally varnished surfaces. This is due in particular to the fact that bonded coatings are touch-dry despite their elasticity, and in particular do not bind dust particles, so that they are resistant to dirt, moisture, and chemical influences. In addition, bonded coatings are highly temperature-resistant and very durable. Between metal or plastic parts, they form separating films or intermediate films that prevent friction and thus noise.

According to a further aspect of the present disclosure, it relates to a method for producing an air diffuser for vehicles, in particular an air diffuser of the manner according to the disclosure described above. It is provided in particular that the method comprises the following method steps: providing an air diffuser housing; providing a screen that is preferably detachably or exchangeably connectable to the air diffuser housing; and providing a decorative element, in particular a decorative element of the manner according to the disclosure as described above.

In particular, it is provided that at least one slot region is formed on the face in the region of the air outlet opening of the air diffuser housing, which slot region is configured so as to at least regionally receive a body region of a connecting part of the decorative element.

Furthermore, it is provided in particular that the screen comprises at least one joining element, which, when the screen is connected to the air diffuser housing, cooperates with the body region of the connecting part of the decorative element in such a way that the screen and the decorative element are fastened to the air diffuser housing.

According to further developments of the method according to the disclosure, it can comprise the following additional method steps:

positioning the decorative element at the air outlet opening of the air diffuser housing in such a way that the body region of the connecting part of the decorative element is received at least regionally in the at least one slot region of the air diffuser housing; and connecting the screen to the air diffuser housing in such a way that the joining element of the screen is received and/or enclosed at least regionally by a recess region or hole, in particular an elongated hole, in the body region of the connecting part of the decorative element.

The disclosure is explained in further detail below with reference to the drawings.

In the drawings, like or like-acting components bear the same reference numerals.

Figure 1B:
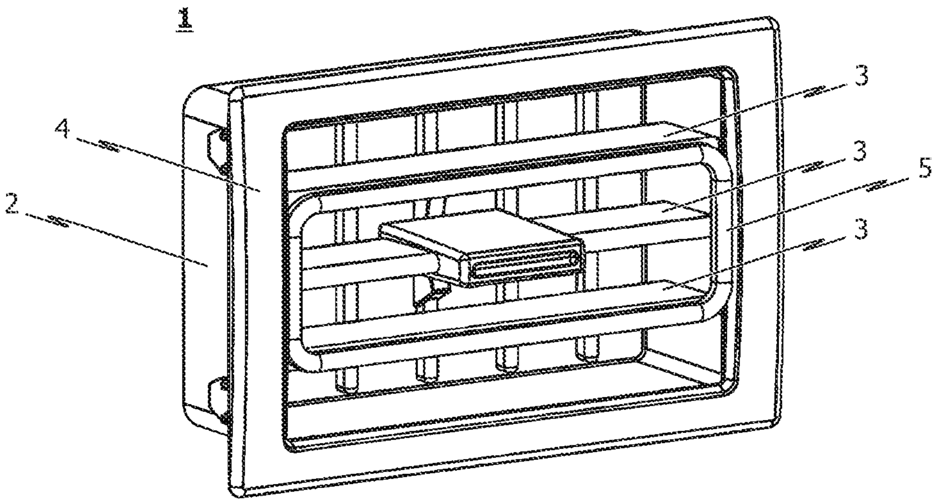
FIG. 1B illustrates schematically and in an isometric view, the air diffuser according to FIG. 1A, but this time with an exemplary embodiment of a decorative element in the form of a chrome brace.

As an example of a vehicle cabin component, FIG. 1A and FIG. 1B each schematically show an air diffuser 1 consisting substantially of an air diffuser housing 2 configured so as to receive differently configured kinematic assemblies. These are, for example, pivotable air-guiding elements/air-guiding blades 3, which serve to deflect the airflow of the air diffuser 1 upwards and downwards, respectively.

In order to visually enhance the cabin component (here: the air diffuser 1), it can be equipped with a corresponding decorative element 5, for example a screen 4 and/or a chrome brace on the air outlet opening of the air diffuser 1, as indicated in FIG. 1B.

Figure 5:
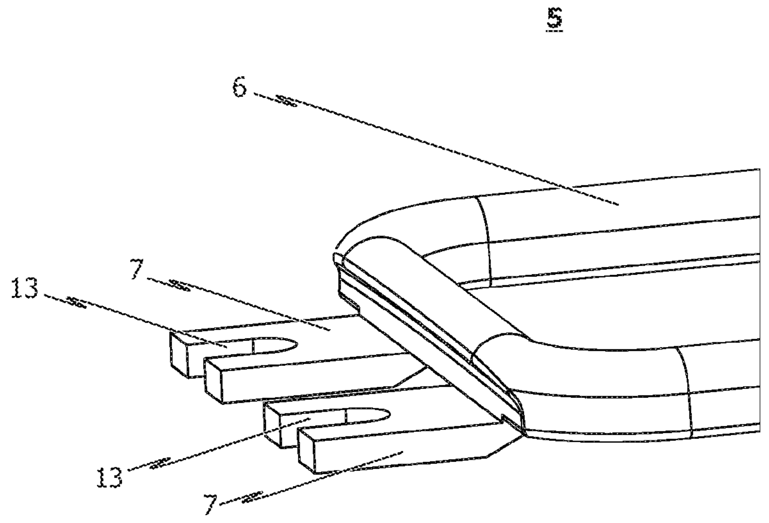
FIG. 5 illustrates schematically, and in an isometric view, a region of the connecting parts of the decorative element.

An exemplary embodiment of this decorative element 5 (here: chrome brace) is partially shown in an isometric view in FIG. 5.

Briefly summarized, the decorative element 5 comprises a base body 6, which is configured at least regionally as a chrome brace and is configured so as to be placed in the region of an air outlet opening of the air diffuser 1 and connected there, preferably in a detachable or exchangeable manner, to the housing 2 of the air diffuser 1 via connecting parts 7 that are connected to the base body 6 of the decorative element 5. The decorative element 5 is formed integrally, and preferably in particular regionally, of plastic.

Referring now to the illustrations in FIG. 2A, B to FIG. 5, the special fastening concept of the decorative element 5 on the housing 2 of the air diffuser 1 will be described in further detail.

Specifically, in FIG. 5, an exemplary embodiment of the decorative element 5 configured as a chrome brace is shown in a schematic and isometric partial view.

Briefly summarized, the decorative element 5 according to this embodiment comprises a base body 6, which, when the decorative element 5 is fastened to the housing 2 of the air diffuser 1, defines the chrome brace, which is visible from the exterior, i.e., from the vehicle cabin.

Two connecting parts 7 are provided on opposite edge regions of the base body 6 of the decorative element 5. These connecting parts 7 serve to connect the decorative element 5 to the air diffuser housing 2, preferably in a detachable or exchangeable manner.

Figure 2A:
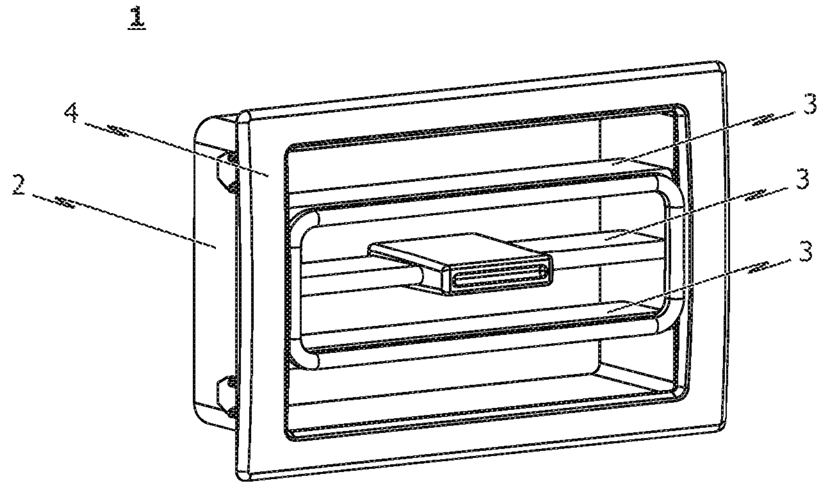
FIG. 2A illustrates schematically and in an isometric view, components of the air diffuser according to FIG. 1B.
Figure 2B:
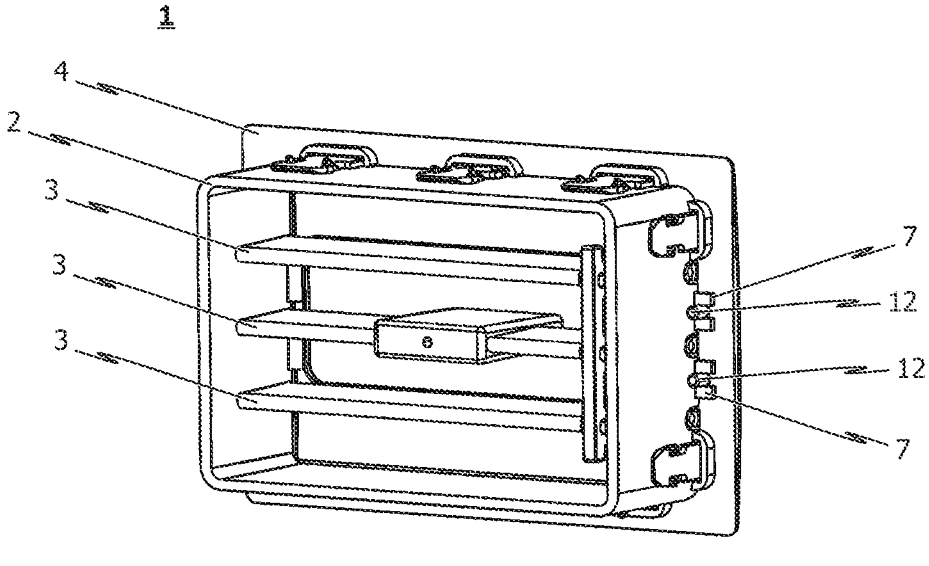
FIG. 2B illustrates schematically and in an isometric rear view, the components of the air diffuser according to FIG. 2A.

As can be seen in particular from the illustration in FIG. 2A, B, for example, in the exemplary embodiment of the decorative element 5 shown in the drawings, the base body 6 of the decorative element 5 has a width that at least substantially corresponds to the width of the air outlet opening of the air diffuser 1. On the other hand, the base body 6 of the decorative element 5 has a height that is less than the height of the air outlet opening of the air diffuser 1.

It is provided that two connecting parts 7 are respectively formed on the two opposite broad sides of the base body 6, which project outwardly from the respective broad side with respect to the base body 6.

In particular, the connecting parts 7 are provided at a rear region of the base body 6 of the decorative element 5, so that the base body 6 at least substantially projects further in the direction of flow than the connecting parts 7 when the decorative element 5 is fastened to the housing 2 of the air diffuser 1.

The respective connecting parts 7 of the decorative element 5 comprise a first joining element, or are configured as a first joining element, and serve as needed to form an at least regional positively locking connection with a second joining element 12 of the screen 4 of the air diffuser 1 and/or the housing 2 of the air diffuser 1. This at least regionally positively locking connection between the connecting parts 7 of the decorative element 5, on the one hand, and the housing 2 of the air diffuser 1 or the screen 4 of the air diffuser 1, on the other hand, is described below in more detail with reference to the illustrations, in particular FIG. 2A, B to FIG. 5.

Figure 3:
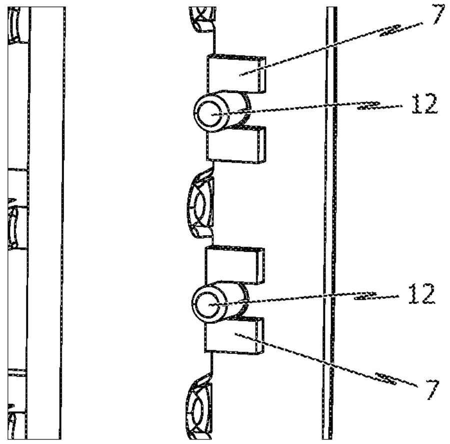
FIG. 3 illustrates schematically, and in an isometric view, a region of the connecting parts of the decorative element.
Figure 4:
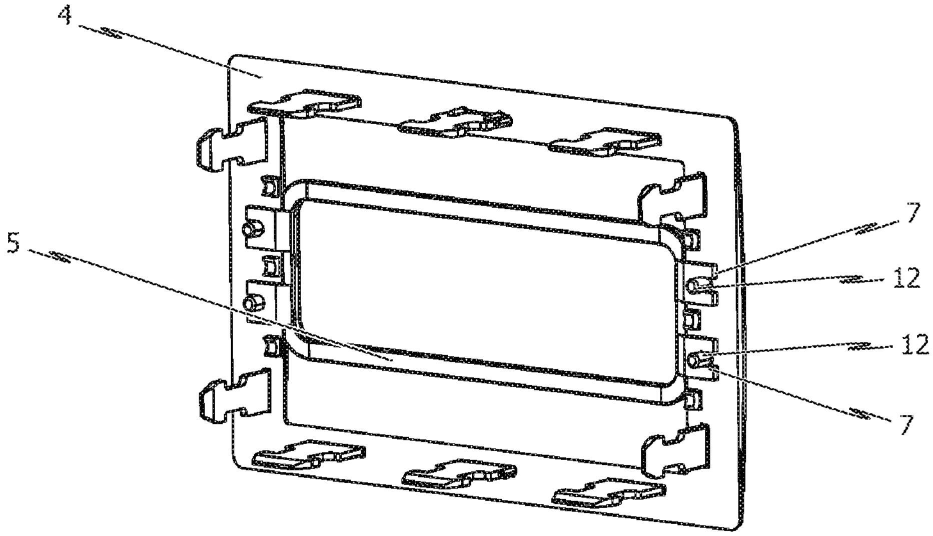
FIG. 4 illustrates schematically and in an isometric view, the screen with the decorative element of the exemplary embodiment of the air diffuser according to FIG. 1B.

The connecting parts 7 of the decorative element 5, respectively configured as (first) joining elements, each comprise a body region projecting from the base body 6 of the decorative element 5, which is configured so as to at least regionally receive and/or enclose the second joining element 12 of the air diffuser housing 2 or the screen 4 of the air diffuser 1, as can be seen in particular in the illustration in FIG. 3.

For this purpose, the body region of the first joining element comprises a recess region 13 or a hole, wherein said recess region 13 or hole is preferably configured at least in regions to be complementary to the second joining element 12 of the screen 4. In the decorative element 5 shown in the drawings, the recess region 13 is configured as a round hole.

Although not shown in the drawings, corresponding slot regions are formed on opposite sides of the air diffuser housing 2, wherein each slot region serves to at least regionally receive a body region of the connecting part 7 of the decorative element 5 projecting outwardly from the base body 6 of the decorative element 5.

The slot region is covered outwardly via the screen 4, which can be detachably or exchangeably connected to the air diffuser housing 2. In particular, it is provided that the screen 4 comprises the aforementioned second joining element 12, which, when the screen 4 is connected to the air diffuser housing 2, cooperates with the body region of the connecting part 7 of the decorative element 5 in such a way that the screen 4 and the decorative element 5 are fastened to the air diffuser housing 2.

As can be seen in particular from the illustration in FIG. 3, the (second) joining element 12 of the screen 4 is configured in particular as a protruding part, preferably in the form of a pin, and is configured in order to be received and/or enclosed at least regionally by a recess region 13 (here: the elongated hole) in the body region of the connecting part 7 of the decorative element 5 when the screen 4 is connected to the air diffuser housing 2.

In FIG. 3, it is indicated that corresponding slots, in particular in the form of blind holes, are preferably configured on the face of the air diffuser housing 2, wherein each slot is associated with a joining element 12 of the screen 4 and is configured in order to at least regionally receive the at least one joining element 12 of the screen 4, in particular while forming a snap or latch connection, when the screen 4 is connected to the air diffuser housing 2.

With the screen 4, the individual connecting parts 7 of the decorative element 5 are thus fixed to the housing 2 of the air diffuser 1. By receiving and enclosing the joining elements of the screen 4, which are formed as protruding parts, in the body region of the connecting part 7 of the decorative element 5, a Y-Z fixation of the decorative element 5 takes place on the air diffuser housing 2.

On the other hand, corresponding slot regions are formed on the front side of the air diffuser housing 2 in which the body region of a connecting part 7 of the decorative element 5 is respectively received in order to thus achieve an X-fixation.

Although not shown in the drawings, it is provided in particular that, when the air diffuser 1 is not equipped with a decorative element 5 of the previously described type, the slot regions in the air diffuser housing 2 are practically not visible from the outside.

Thus, the decorative element 5 according to the disclosure is particularly suitable for optional decoration of air diffusers.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A decorative element for an air vent, wherein the decorative element comprises a base body including at least one connecting part, wherein the at least one connecting part comprises a first joining element for forming a locking connection with a second joining element, formed on an air vent housing of the air vent or on a screen of the air vent, wherein the first joining element comprises a body portion projecting from the base body, wherein the body portion comprises a recessed portion with an open end and a closed end, wherein the recessed portion opens laterally at the open end and terminates at the closed end, and wherein the body portion is configured to join with the second joining element.

2. The decorative element according to claim 1, wherein the body portion projecting from the base body of the decorative element is configured to be received at least partly in a recessed portion formed at least partly in the air vent housing or in a screen of the air vent.

3. The decorative element according to claim 1, wherein the base body of the decorative element is formed at least partly as a chrome brace and is configured so as to be placed in a portion of an air outlet opening of the air vent and connected there in a detachable or exchangeable manner; to the air vent housing via the at least one connecting part.

4. The decorative element according to claim 3, wherein the base body of the decorative element has a width corresponding at least substantially to a width of the air outlet opening of the air vent, and wherein the base body of the decorative element has a height less than a height of the air outlet opening of the air vent, wherein the at least one connecting part is formed on at least a broadside of the base body, and projects outwardly from a corresponding broadside with respect to the base body.

5. The decorative element according to claim 1, wherein the decorative element is formed integrally of plastic.

6. The decorative element according to claim 1, wherein the first joining element of the decorative element is configured so as to form a snap or latch connection with the second joining element of the air vent housing or the screen of the air vent.

7. An air vent for vehicles, comprising an air vent housing and a decorative element according to claim 1, wherein the decorative element is connected or connectable to the air vent housing in a detachable or exchangeable manner in such a way that the base body of the decorative element is placed at least partly in a portion of an air outlet opening of the air vent.

8. The air vent according to claim 7, wherein at least a recessed portion is configured on opposite sides of the air vent housing, in which recessed portion the body portion of the at least one connecting part of the decorative element projecting outwardly from the base body of the decorative element is at least partly receivable.

9. The air vent according to claim 7, wherein the air vent comprises a screen that can be detached or exchangeably connected to the air vent housing at the air outlet opening of the air vent, wherein the screen comprises at least one joining element, which, when the screen is connected to the air vent housing, cooperates with a body portion of the at least one connecting part of the decorative element in such a way that the screen and the decorative element are fastened to the air vent housing.

10. The air vent according to claim 9, wherein the at least one joining element of the screen is formed and configured as a protruding part in order to be received or enclosed at least partly by the recessed portion in the body portion of the at least one connecting part of the decorative element when the screen is connected to the air vent housing.

11. The air vent according to claim 10, wherein at least one recess is configured on a face of the air vent housing and is associated with the at least one joining element of the screen and is configured, when the screen is connected to the air vent housing, to at least partly receive the at least one joining element of the screen while forming a snap or latch connection.

12. The air vent according to claim 7, wherein at least a portion of the air vent housing, the decorative element, or the screen comprises an anti-creaking coating.

13. A method for manufacturing an air vent for vehicles, wherein the method comprises: providing an air vent housing; providing a screen that is detachably or exchangeably connectable to the air vent housing; and providing a decorative element according to claim 1, wherein at least one recess portion is formed on a face in the portion of an air outlet opening of the air vent housing, which recess portion is configured so as to at least partly receive a body portion of a connecting part of the decorative element, and wherein the screen comprises at least one joining element, which, when the screen is connected to the air vent housing, cooperates with the body portion of the at least one connecting part of the decorative element in such a way that the screen and the decorative element are fastened to the air vent housing.

14. The method according to claim 13, wherein the method further comprises the following method steps: positioning the decorative element at the air outlet opening of the air vent housing in such a way that the body portion of the at least one connecting part of the decorative element is received at least partly in the at least one recessed portion of the air vent housing; and connecting the screen to the air vent housing in such a way that the joining element of the screen is received or enclosed at least partially by the recessed portion in the body portion of the at least one connecting part of the decorative element.

15. A decorative element for an air vent of a vehicle, the decorative element comprising: a base body; and at least one connecting part carried by the base body, the at least one connecting part comprising a first joining element configured to form a locking connection with a second joining element on an air vent housing of the air vent or on a screen of the air vent, wherein the first joining element comprises a body portion that projects outwardly from the base body, the body portion defining a recess having a lateral opening at a first end of the recess and a closed terminating wall at a second end of the recess opposite the first end, the recess being configured to receive the second joining element through the lateral opening and to retain the second joining element against the closed terminating wall when the locking connection is formed.

16. The decorative element of claim 15, wherein the base body has a width corresponding substantially to a width of an air outlet opening of the air vent and a height less than a height of the air outlet opening of the air vent, and wherein the at least one connecting part projects outwardly from a broadside of the base body.

17. The decorative element of claim 16, wherein a connecting part projects outwardly from each of two opposing broadsides of the base body.

18. The decorative element of claim 15, wherein the base body is formed as an elongated chrome brace configured to span at least a portion of an air outlet opening of the air vent.

19. The decorative element of claim 15, wherein the first joining element is configured to form a snap connection or a latch connection with the second joining element.

20. The decorative element of claim 15, wherein the base body and the at least one connecting part are formed as a unitary one-piece plastic structure.

* * * * *